(12) United States Patent
Jerman et al.

(10) Patent No.: US 8,540,081 B2
(45) Date of Patent: Sep. 24, 2013

(54) FLUOROPOLYMER HOLLOW FIBER MEMBRANE WITH FLUORO-COPOLYMER AND FLUORO-TERPOLYMER BONDED END PORTION(S) AND METHOD TO FABRICATE

(75) Inventors: Robert Edward Jerman, Chalfont, PA (US); Cornelius Brown, Jr., Cherry Hill, NJ (US); Kenneth Donald Hobbs, Dover, DE (US); Carlos Ruano, Parkesburg, PA (US); Charles Edward Wolanski, Bensalem, PA (US)

(73) Assignee: Markel Corporation, Plymouth Meeting, PA (US)

( * ) Notice: Subject to any disclaimer, the term of this patent is extended or adjusted under 35 U.S.C. 154(b) by 205 days.

(21) Appl. No.: 13/065,183

(22) Filed: Mar. 16, 2011

(65) Prior Publication Data
US 2012/0234745 A1 Sep. 20, 2012

(51) Int. Cl.
- *B01D 69/08* (2006.01)
- *B01D 71/36* (2006.01)
- *B01D 63/02* (2006.01)
- *B01D 71/32* (2006.01)

(52) U.S. Cl.
USPC ............ 210/500.23; 210/321.88; 210/321.89; 210/500.36; 156/296

(58) Field of Classification Search
USPC ............... 210/321.88, 321.89, 321.79, 321.8, 210/500.23, 500.36; 156/166, 176, 178, 156/184, 192, 195, 295, 296, 309.9, 311, 156/322
See application file for complete search history.

(56) References Cited

U.S. PATENT DOCUMENTS

| | | |
|---|---|---|
| 5,066,397 A | 11/1991 | Muto |
| 5,284,584 A | 2/1994 | Huang |
| 5,373,620 A | 12/1994 | Zine |
| 5,695,702 A | 12/1997 | Niermeyer |
| 6,224,765 B1 | 5/2001 | Watanabe |
| 6,582,496 B1 | 6/2003 | Cheng |
| 6,663,745 B1 | 12/2003 | Cheng |
| 2005/0230856 A1 | 10/2005 | Parekh |
| 2009/0015009 A1 | 1/2009 | Spiegelman |

FOREIGN PATENT DOCUMENTS
WO WO 00/44483 8/2000

OTHER PUBLICATIONS
PCT International Search Report PCT/US2012/029439 dated Oct. 31, 2012, sent and attached separately.

*Primary Examiner* — John Kim
(74) *Attorney, Agent, or Firm* — Leslie A. Cohen

(57) ABSTRACT

A hollow fiber membrane fluid transport device and its method of manufacture are disclosed wherein the fibers are comprised of Polytetrafluoroethylene (PTFE), and the potting materials are comprised of fluorocopolymer and or fluoroterpolymer based materials. The potting method described herein, utilizes a compressed chemically resistant fluorocopolymer and or fluoroterpolymer film, allows for ease of manufacture without destruction of the PTFE hollow fibers, with high packing densities, and without the processing complexity of pre-melting, extruding, or chemical crosslinking of any polymeric adhesives. Furthermore, the PTFE hollow fibers can be treated with a fluoropolymeric solvent solution before the chemically resistant film is applied to enhance the adhesion of the PTFE fiber to the film. PTFE hollow fibers, and its respective fluoro-co and terpolymers as potting films, impart high packing densities, superb chemical resistance and temperature resistance without membrane contamination, or low fiber pull strength, as is sometimes observed with standard potting materials such as polyurethane and epoxy.

45 Claims, 15 Drawing Sheets

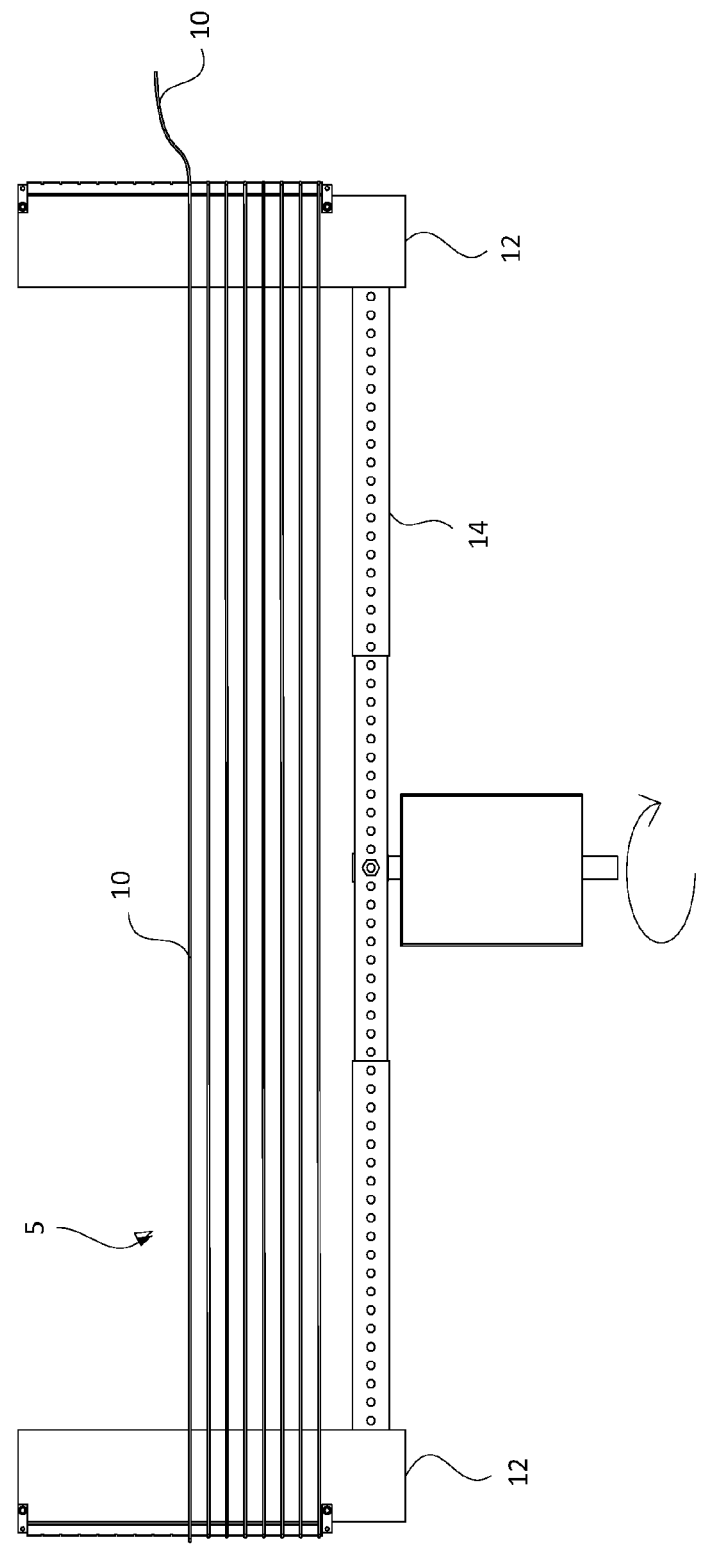

FLUOROPOLYMER HOLLOW FIBER MEMBRANE WITH FLUORO-COPOLYMER AND FLUORO-TERPOLYMER BONDED END PORTION(S) AND METHOD TO FABRICATE

BACKGROUND

Field

This application relates to hollow fiber membrane fluid transport devices, specifically to the method of manufacturing such membrane fluid transport devices, and even more specifically to the means of assembling the hollow fibers into bundles and sealing the ends of the hollow fibers to make suitable contactors.

BACKGROUND OF THE INVENTION

Membrane contactors are useful devices for separation processes, contacting processes, or as filters. A membrane contactor includes a membrane or membranes held in such a manner as to separate two regions of flow and enable the membrane to act as a separation means between the two phases, and a housing to enclose the membrane and contain and direct the flow of the multiple phases. The membrane acts as a barrier between the two fluid phases and selectively allows or prohibits the transport of one or more chemical species or particles from one fluid stream to the other. The housing has one or more ports to allow flow to and from the membrane. Membrane contactors can be considered as a sub-class of the more general class of fluid or fluid/gas transport devices.

Membrane contactors have applications as filters, separation systems, or contacting devices in many industries such as chemical, pharmaceutical, food and beverage, environmental, water treatment, and semiconductor processing. Membrane separation processes such as gas/liquid separation or membrane distillation are replacing their bulk counterparts (distillation towers, stripping columns) due to improved energy efficiency, scalability, the ability to operate isothermally, and smaller physical footprints. In addition, membrane filters, separators, and contactors generally have no moving parts and are physically simple and rugged, resulting in low maintenance cost.

Hollow fiber membrane devices are one class of membrane modules that employ membranes in hollow fiber form. While many types of membranes are available in sheet form, the ability to create significantly higher surface area per unit volume with a hollow fiber membrane is of major advantage to the designer and user of a membrane filter or contactor. A hollow fiber membrane is also typically self-supporting in contrast to flat sheet or thin film membranes that usually require a skeletal structure for support. In addition, typical contactor designs employing hollow fiber membranes, whether constructed as a cross flow element or in a dead-end configuration, offer more uniform flow and fewer regions for the flow to stagnate.

The usefulness and efficiency of a membrane contactor is determined by the available surface area of the membrane per unit volume of the device and the rate at which the transfer or removal of the species of interest occurs; this is generally governed by the flux (flow per unit area, per unit time, per unit pressure gradient) of the process stream. The available surface area for a hollow fiber membrane module is dictated by the packing density of the fibers (the ratio of the sum of the cross sections of the individual fibers to the total available cross sectional area). The higher the packing density and the greater the surface area to volume ratio generally results in a more efficient module.

Two other useful parameters for defining the performance of a porous membrane are the pore size distribution and the porosity. The pore size distribution is a statistical distribution of the range of pore diameters found in the membrane wall. The largest pore size is also generally characterized by a measurement called a bubble point, which is defined in the below detailed description of the invention. The smaller the mean pore size, the smaller the particle a membrane filter will separate.

The porosity of a hollow fiber membrane may be defined as the percentage of free volume in the membrane, or, for PTFE hollow fiber membranes, as $(1-(\text{membrane density}/2.15)*100$ where 2.15 is the density of solid PTFE. The higher the porosity, the more free volume and generally the higher the flux rate through the membrane wall.

For a given pore size distribution, higher porosities are often desirable as they lead to higher flux rates. Unfortunately higher porosities also generally lead to softer membrane walls, causing the hollow fibers to be structurally very soft and prone to deformation and collapse, especially during a potting process. Heating the ends of the hollow fibers reduces the porosity and hardens the heated portion of the fibers, reducing the likelihood of the fibers being crushed or deformed on compression.

The elements of a hollow fiber membrane contactor include the hollow fiber membrane itself, the housing, and a means to bind the fibers to one another and to the housing. A hollow fiber membrane is a porous or non-porous, semi-permeable membrane of defined inner diameter, defined outer diameter, length and pore size, and generally of a very high aspect ratio, defined as the ratio of the length to the diameter of the fiber. A hollow fiber membrane contactor is generally comprised of a plurality of fibers.

The housing is an outer shelf surrounding the membrane that secures and contains a potted bundle of hollow fibers. The housing is equipped with one or more inlets and one or more outlets, such that the potted bundle of hollow fiber membrane acts as a barrier and separates the two phases or process streams. The design of the housing, and specifically the relationship of the inlets and outlets, regulates the flow of the process fluid into or out of the fiber lumens and directs the processed fluid away from the device. There are typically two common modes of designing the housing, which relate to how the fluids interact with the membrane. What are known to those well versed in the art as dead-end elements consist of a housing that directs all of the volume of one fluid to pass through the membrane walls to reach the discharge or exit of the housing. The dead-end design is a very common design employed for membrane filtration. For dead-end hollow fiber membrane filters, both ends of each hollow fiber membrane are potted or bound at one end of the housing. In dead-end hollow fiber membrane filters the process fluid either enters the lumens of the hollow fibers and discharges out through the walls of the hollow fiber membrane, or enters through the walls and discharges out of the lumens. In either case, this ensures that the entire process stream passes through the membrane wall.

A dead-end hollow fiber membrane filter configuration is contrasted to a cross flow configuration in which the lumens are open at both ends, and only a portion of the process stream entering the upstream lumens passes through the membrane wall, while the remainder of the fluid discharges through the downstream lumen openings. The portion of the fluid discharging from the downstream lumen end may be passed along to another membrane element, recycled to the beginning of the unit, or discarded. The cross flow configuration mode is employed with both filtration as well as membrane contacting or separation processes.

A hollow fiber membrane bundle may be integral to the housing or may be designed so that the potted hollow fiber membrane bundle may be installed and removed.

To create a membrane filter or membrane separator or contactor module, one must establish a suitable means for binding the hollow fiber membranes into an integral bundle and sealing the exposed ends of the hollow fibers from the body of the module, a process hereafter referred to as potting the fibers. Potting the hollow fiber membranes may occur prior to, or during the operation of mounting the hollow fiber membranes into the housing. To bind the ends of the hollow fibers to one another, a potting compound is employed. A potting compound is a material that when applied around the ends of hollow fibers, bonds them together into a solid, cohesive mass that isolates and fixes the hollow fibers from the remainder of the bundled assembly of fibers.

A potted bundle of hollow fibers is a plurality of hollow fiber membranes bound together or potted at least at one end. Both ends may be potted, or the ends of each individual fiber may be looped back in a U-shape and potted at or near one end. One potential configuration can be where the bundled fibers are first twisted 180 degrees and then folded into itself to form a closed end and an open end with the open end potted, i.e.—embedded in a solid mass providing a fluid-tight seal around each fiber. There may be several themes and variations on these basic configurations.

Membranes for contactors or filters have been developed from a variety of synthetic polymers and ceramics and have been known in the industry for many years. While ceramic membranes offer the chemical resistance and high service temperature required by aggressive acidic, alkali, or organic solvent applications, in their present-day state they are very fragile, very expensive, and very difficult to work with, a combination of features that keeps ceramic membranes out of many applications.

The vast majority of state of the art polymeric membranes are limited as they are not inert, they possess inadequate chemical purity, thermal stability and chemical resistance, and occasionally have undesirable surface properties, preventing their use in certain important applications. This is because these very same membranes are spun from solution, and the fact that they must be soluble in certain solvents to convert to a membrane means that the final membrane itself is susceptible to attack by those same classes of solvents.

It has long been desired to be able to have membranes manufactured from fluorinated or perfluorinated resins due to their high service temperatures, chemical stability, inertness, and chemical resistance to a wide range of solvents, acids and alkali systems. However, membranes produced from non-fully fluorinated polymers still require aggressive solvent systems and very high processing temperatures to manufacture, increasing cost and generating environmental and waste issues. Membranes manufactured from Polytetrafluoroethylene (hereafter referred to as PTFE) are most desirable because, as a fully fluorinated polymer, they offer the best combination of thermal and chemical stability of all the fluorinated and perfluorinated resins commercially available. In addition, the method by which they are converted to membranes does not employ hazardous solvent systems; instead using a stretching and orientation method.

It is also desirable to have membranes manufactured from fluorinated or perfluorinated resins, especially fully fluorinated resins, due to their low surface energy Filtration of organic liquids, separating organic from aqueous systems, or removing vapor from aqueous systems all favor low energy membranes. PTFE offers the lowest surface energy of all the fluorinated or perfluorinated polymeric membranes-less than about 20 dyne-cm.

Current potting materials have many limitations such as inadequate chemical resistance, lack of chemical purity and inertness, and poor thermal stability. They are also very difficult to use, and produce inefficient and costly modules. One such class of inadequate potting systems consists of low viscosity materials including urethanes and epoxies which are easy to apply but are chemically very impure and are not chemically resistant, nor do they offer high service temperatures.

It is also therefore highly desirable to have a potting compound that has excellent chemical resistance and high service temperatures that would match those of the fluorinated, perfluorinated, or fully fluorinated membrane, because the effectiveness of a contactor constructed with a fluorinated or perfluorinated membrane for a thermally or chemically aggressive system is limited by the weakest part of the device. An effective combination of a potting system for a fluorinated or perfluorinated membrane has hitherto been unavailable. Current potting methods are not amenable to the use of fluorinated or perfluorinated compounds; they cannot produce membrane modules with high fiber packing density, or with economical manufacturing cycle times; nor can they be employed to make contactors with relatively soft fibers or contactors containing many thousands of fibers, something necessary for many commercial membrane applications.

PRIOR ART

In the art, various adhesives, such as epoxies, polyurethanes, cyanoacrylates, etc. have been used for bonding or potting the ends of hollow fibers together into an integral assembly (for example, H. Mahon, U.S. Pat. No. 3,228,876, Mahendran et al. U.S. Pat. No. 6,685,832). These systems offer the advantage that the potting compound flows readily between the fibers, but methods utilizing these adhesives for potting fluoropolymer membranes in general and PTFE membranes in particular suffer from serious limitations. The adhesion of epoxies, cyanoacrylates, and polyurethanes to fluoropolymer fibers, in general, and PTFE in particular, is very limited, resulting in assemblies that suffer from fiber pullout and failure due to pressure or thermal cycling. More importantly, materials such as epoxies, polyurethanes, cyanoacrylates, etc. suffer from very limited chemical and thermal stability, thus greatly limiting the types of high temperatures or harsh or aggressive chemical environments for which one would want to use PTFE hollow fibers.

Some practitioners avoid the use of potting compounds such as epoxies, polyurethanes, cyanoacrylates, etc. via melt bonding the fibers, eliminating the use of potting compounds all together. Melt bonding has it's own limitations.

Muto et al. (U.S. Pat. No. 5,066,397), Suzuki et al (U.S. Pat. No. 7,291204B) and other practitioners teach methods for assembling thermoplastic hollow fiber membranes via a fusion process. In both the Suzuki and the Muto fusion process at least one set of the ends of the hollow fibers are bundled together and heated above the softening point of the hollow fibers allowing the ends to form into a solid end terminal block. PTFE however will not fuse with itself unless exposed to temperatures in excess of 340° C. and very high pressures (greater than 50 bar). Exposure to the extreme temperatures and pressures would crush the fibers and destroy the porous structure, thus rendering the Muto process and others like it, that require a melting or softening of the hollow fiber membrane, unsuitable for PTFE. The fusion method employed by Muto, Suzuki, and others also suffers from the limitation of not being able to control the fiber spacing, something necessary for high solids filtration applications or larger high flow rate contactors where the tightness may restrict the flow.

Spiegelman et al. (U.S. Pat. No. 7,625,015) teaches the use of a connector with a series of pre-drilled holes through which fibers are placed and then crimped in place via an external swaging ring. A major limitation of the Spiegelman method is that the fibers must have a significant degree of rigidity to maintain the seal. Sealing with a tight clamp as required by Spiegelman would crush the soft PTFE fibers and a tight, leak proof seal would not be achieved. This method would not be suitable for contactors with desired high packing density.

U.S. Pat. No. 5,695,702 (Niermeyer) teaches a technique for building and sealing the ends of hollow fiber membranes into a module by contacting an array of hollow fibers with an extruded molten thermoplastic polymer. The molten thermoplastic polymer flows over and in between the hollow fiber ends as they are assembled into an array. The process as described by Niermeyer is not effective for PTFE hollow fibers and not as efficient as the present invention herein for any fluoropolymer fiber for several important reasons. The Niermeyer process requires that the molten thermoplastic polymer be heated and applied at a contact temperature higher than the melting point of the hollow fiber membrane. This allows the material to flow between the fibers and more importantly results in at least partial melting of the hollow fiber membrane wall to form an integral bundle. For PTFE hollow fiber membranes, heating the fiber or exposing the fiber to temperatures near or at its melting point (327° C.-345° C. depending on degree of sinter) would destroy the integrity of the fiber, changing the pore structure of the hollow fiber.

In addition, as known by those practiced in the art, the type of thermoplastic polymers cited in Niermeyer that are capable of being extruded into an unsupported molten web, are very viscous in their molten state; and thus, it would require large gaps between the fibers to allow the melt to flow between the fibers; a critical requirement to form a leak free potted assembly. The Niermeyer technique requires that the molten polymer flow quickly between the fibers before the next layer is applied on top or the unit will leak. This flow is driven strictly by gravity, as there is no means of forcing the melt between the fiber. The spacing between the adjacent fibers and between layers of fibers is large, resulting in poor fiber packing density and loss of efficiency of the finished unit.

Huang et al. (U.S. Pat. No. 5,284,584) teaches a method very similar to Niermeyer, as Huang also utilizes a melt extrusion potting method. However, in Huang, the molten thermoplastic extrudate used for potting must have a melting point 10° C. or lower than that of the fiber, while in Niermeyer the extrudate is at a higher temperature than that of the fiber. Although this overcomes the limitation of having to use extreme temperatures for extrusion potting utilized in the Niermeyer patent, Huang does not address the issue that the use of a melt for potting prohibits high packing density of the fibers. However, this imparts another limitation, as cited by Niermeyer, the lower temperature used for potting in Huang limits the use temperature of the finished device made by such a technique. Most limiting is that Huang also claims that the fiber tubes are only thermoplastic. Huang also only claims polyolefinic tubes, and more highly prefers (in the specification) polyolefin tubes as well as polyolefinic potting agents.

Cheng et al. (U.S. Pat. No. 6,663,745 and its patent family) teaches a method employing a perfluorinated polymer for potting perfluorinated hollow fibers which overcomes only some of the difficulties outlined earlier. In Cheng, a solid mass of a perfluorinated polymer is heated and degassed in an oven to a molten state and a set of looped hollow fibers are suspended in a hole created in the molten polymer. Driven by gravity, the molten potting polymer flows between the hollow fibers, filling the voids between the fibers. The resultant mass is cooled, annealed, and the bottom of the potted mass is cut off to reveal the open lumens. The Cheng method contains severe method and practical limitations for commercial hollow fiber modules. Cheng teaches that preparation of the potting polymer requires that the polymer be held at elevated temperatures 16 to 72 hours, and preferably 24 to 48 hours, to allow melting and degassing in the oven. The Cheng process requires the use of a polymer with a low enough melt viscosity to flow freely through the fibers, greatly limiting choices of potting materials, an additional 16 to 24 hours for the polymer to diffuse in amongst the hollow fibers, and an additional 16 to 24 hour annealing step following potting for a combined assembly time from 48 hours to five days.

The Cheng patent is also limited to smaller bundle diameters as the time required to diffuse into the center of larger units would be excessive, resulting in burnt polymer, very high assembly costs and the risk of voids in the potted assembly. Because Chung requires the unaided flow (other than gravity) of a highly viscous fluid between the fibers, the fiber packing density cannot be high, severely limiting the use of the contactor due to surface area limitations. Cheng also cites examples where the addition of a wire grid for spacing is required to achieve a packing density of only 60% for this reason. Addition of grids and other fiber spacing techniques adds cost and time to construction, as each fiber must be individually threaded through the mesh. The use of such grids would be unimaginable for typical commercial modules that employ thousands of fibers.

In WO2000/044483A2 (Yen, filed Jan. 27, 2000), Yen claims a method similar to Niermeyer, but for potting an all perfluorinated thermoplastic fiber membrane device. The Yen method also claims that a TFE/HFP or TFE/Alkoxy tape can be used in a potting method. However, Yen specifically prohibits the use of PTFE hollow fibers in his patent application, even excluding the use of PTFE in the claims: Yen states that PTFE is not a thermoplastic and that it is difficult to mold and form into various shapes. Of equal commercial concern is that the packing density in the Yen device is very low (as is the packing density of other potted systems in the literature carried out via a melt extrusion process) compared to the packing density of the invention herein. All of the polymer melt flowing potting methods are limited by the need to maintain significant spacing between the fibers to accommodate the flow of the very viscous polymer. Yen specifies 45-65% packing density in the preferred mode with the stated reason as to avoid incomplete potting and the formation of voids. Like the Niermeyer potting method, the Yen method has no control of packing thickness and packing density, and requires considerable time to assemble even a small unit. The Yen method also calls for a required post-potting heat treatment to ensure no voids or leaks in the potted end, a step that adds considerable additional costs for assembly.

In comparison to Niermeyer and Huang, the polymeric film potting method stated herein has the advantage of eliminating the need to allow space and time for a molten polymer to flow between the fibers. The film potting method also offers additional advantages over the Niermeyer process when applied to PTFE hollow fibers, in that the fibers may be spaced significantly closer to one another as no unessential space is needed for the flow of a very viscous fluid. In addition, polymeric film as a potting agent doesn't typically flow into the open holes at the end of the hollow fibers, so one doesn't have to add the additional method step of cutting and removing open fibers filled with potting agent.

The invention herein also overcomes all of the limitations in Cheng. The film potting method is suitable over a wide variety of bundle diameters, including the number of fibers and choice of potting polymers. Furthermore, the present invention allows the designer to generate tightly packed fiber bundles or to deliberately create spacing between the fibers to enhance flow on the shell side of the module. In addition, larger units with greater numbers of fibers and the ability to control packing density offer significant design advantages to the end user. The film potting method stated herein also has advantages over the methods in the Muto and Spiegelman patents as it is a more gentle process and it does not lead to the crushing of the fibers. The film method also does not result in fiber contamination, as does methods using epoxies, polyurethanes, cyanoacrylates, and other non-fluoropolymers as potting agents.

As is apparent from the limitations cited in the above art, for fluorinated, and perfluorinated hollow fiber membranes in general, and PTFE hollow fiber membranes in particular, there exist many needs for improvements in potting methods that have not yet been satisfied. The limitations in the art and current day commercial potting needs are reemphasized below.

The ideal potted end must have a long lasting and robust bond between the potting medium and the hollow fiber (the fiber must have strong adhesion to the potting compound so that the fibers cannot be pulled or pushed out under the temperature and pressure cycles of normal operation). A potting method is needed that does not destroy, distort, deform, or otherwise damage or hurt the integrity of the hollow fiber. If the fiber is collapsed or distorted, a flow restriction results, and the ensuing module is less efficient. If the fiber is collapsed or damaged, the fiber may leak under subsequent operation, resulting in a defective module. A distorted fiber may not fully bond with the potting material, resulting in a flow path between the fiber wall and the potting compound, or between the fiber and shell, or potting material and shell, resulting in a leak and a defective module.

The ideal potting material must be of a nature that it's thermal resistance, chemical resistance, chemical inertness, and chemical composition, do not limit the use of the hollow fibers, that is, the chemical resistance and service temperature of the potting material ideally would match or come close to matching that of the membrane itself. The potting compound must be as chemically robust as the hollow fiber membrane or the range of applications of the module will be diminished and the end user will not be able to capitalize on the desired properties of the membrane.

The ideal potting method must allow for efficient packing of fibers, meaning that the fibers must be able to be packed closely together, accommodating as many fibers in the cross sectional area of the module as possible. The ideal potting method should allow for control over the packing density of the fiber so that the designer can accommodate high solids level applications, high flow applications, and other conditions that may dictate larger spacing between fibers. The ideal potting method should accommodate or be adaptable to any number of fibers as filters and contactors may range from a few fibers up to many thousands. The ideal potting method should accommodate a wide range of fiber diameters without having to sacrifice module construction efficiency or packing density. The ideal potting method should accommodate a wide range of fiber porosities and of varying softness. Finally, the marketplace dictates that the potting method should be cost effective, low in labor and short cycle times.

As will be disclosed, the invention that is the subject of this patent overcomes all the inadequacies of prior art as well as meeting all of the desired characteristics outlined above.

DESCRIPTION OF THE DRAWINGS

The operation of the present invention should become apparent from the following description when considered in conjunction with the accompanying figures, in which:

FIG. 3: Support frame with hollow fiber being wound over ends

SUMMARY OF THE INVENTION

Figure 1:
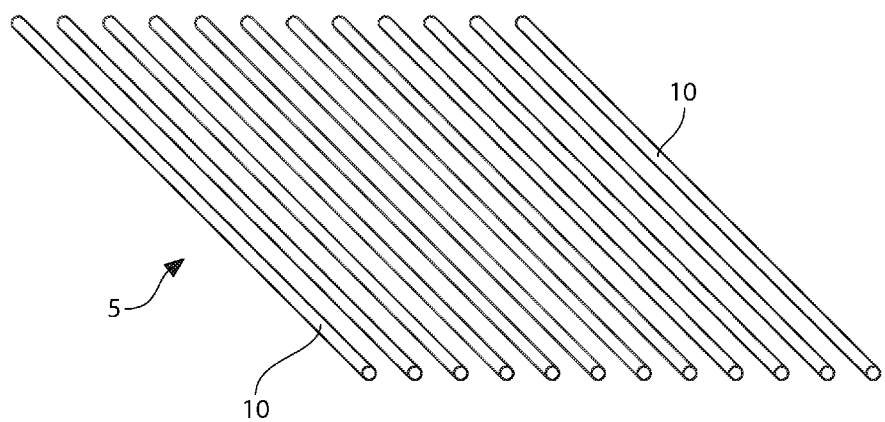
FIG. 1: Illustration of a typical array of hollow fibers

The posited challenges of potting or sealing soft hollow PTFE fiber membranes have been solved in this patent application. We have invented a system to reliably and rapidly seal the PTFE hollow fibers together and fill the interstices between the fibers, and we have identified materials that are chemically and physically compatible with both the hollow fiber membrane and the process fluids to be used in the contactor module. We have also invented a device that incorporates the said potting system. The polymeric film potting system presented herein overcomes all the challenges listed above by: not requiring the fiber wall to be softened (by excessive heating), by ensuring the bonding thermoplastic resin (in the form of a polymeric film) is in between each adjacent fiber, and by allowing very close fiber spacing, and high packing densities (due to the compressing means). This is also accomplished without the longer processing time necessary for a viscous material to flow under gravity in between the fibers.

The potting method described herein offers significant advantages over all other potting methods disclosed in the art for fluoropolymer membranes in general and PTFE membranes in particular. These advantages are: the ability to economically produce potted fiber bundles with high packing densities regardless of the diameter of the fiber or of the unit, applicability regardless of how soft the hollow fiber membrane, the ability to economically produce virtually any diameter and length module, and short cycle times, regardless of the nature of the fiber or size of the unit.

The potting polymeric film we utilize can be defined as any type of generally flat material whose length and width are significantly greater than its thickness, and usually, although not a requirement, whose length is far greater than its width. The potting film can have a thickness that is less than the diameter of the hollow fibers down to less than one hundredth of the diameter of the hollow fibers. It is ideal that the film be as thin as possible. In fact, the film can be very thread like in thickness, as long as it can be handled during manufacture. The length of the potting film (along the length of the hollow fiber) can be less than, or equal to, the diameter of the bundled fibers down to less than one hundredth of the diameter of the bundled array of fibers. Thinner film results in a higher fiber packing density. The width of the film can be equal to the length of the film, although the width is variable, as the more fibers that are used, the more film is needed to surround each fiber. It is preferred that the film be applied to as close to the ends of the hollow fibers as possible, so that upon melting it does not flow into the hollow fibers. It is most preferred that the length of the portion of the film along the length of the hollow fiber is even with the ends of the hollow fiber and again, so that upon melting the melted film does not flow into the ends of the hollow fibers. Any type of chemically resistant thin film can be used to form a web over the ends of fiber bundled in a generally parallel configuration. Herein, the film to be used must be very chemically resistant and can be chosen from the list of perfluorinated copolymers of: TFE/HFP, TFE/Alkoxy, TFE/PPVE, TFE/CTFE, and copolymers of Ethylene such as EthylenefTFE, Ethylene/FEP, and other similar fluorinated polymers such as DuPont™ SF-50 and Solvay™ Hyflon 940 AX, or fluorinated terpolymers of Ethylene/VDF/HFP (Dyneon™ THV).

in another embodiment the fluoropolymer or other polymer used for the film or potting compound may be dissolved in a solvent such as acetone, butyl acetate, ethyl acetate, N-methyl pyrrolidone, or methyl ethyl ketone to create an adhesion promoter or primer solution. One preferred polymer solution is comprised of fluorinated terpolymers of Ethylene/VDF/HFP (Dyneon™ THV) and butyl acetate. The dilute adhesion promoter solution may be applied to the ends or near the ends, or for that matter on any portion of the porous PTFE hollow fibers where the film will be applied, allowing the adhesion promotion solution to wick or infuse into the pore structure of the hollow fiber. Upon drying or removal of solvent, the residual polymer or adhesion promoter that is infused into the inner pores of the fiber promotes enhanced adhesion between the potting film and hollow fibers.

According to one aspect, the present invention provides a fluid transport device having a plurality of perfluorinated polymer fibers that have an inner diameter and an outer diameter. At least one end of each fiber is open for fluid entrance or exit. The fibers are substantially parallel to one another and a length of polymeric film bonds the fibers together by contacting outer surface areas of the fibers adjacent ends of the fibers and filling interstitial volume between the fibers According to another aspect, the present invention provides a hollow fiber membrane fluid transport device comprising a cylindrical containment shell containing polytetrafluoroethylene hollow fibers treated with a solvent polymer solution. The solution comprises a polymer used to prepare a potting film so that after solvent removal by drying, the fibers are bound together in bundles by at least one segment of film interwoven through interstitial spaces between the fibers and contacting each fiber near or at the ends of the bundles of the fibers.

According to yet another aspect, the present invention provides a method for producing a hollow fiber membrane fluid transport device. The method includes the step of laying polytetrafluoroethylene hollow fibers in an array or a row. Fluorinated homopolymer, copolymer, or terpolymer film is applied to the hollow polytetrafluoroethylene fibers interwoven between the fibers near one end or both ends of the hollow polytetrafluoroethylene fibers. The fibers and film are rolled into a bundle. A portion of the bundle is then heated and compressed to melt the film such that the film melts and flows between the hollow fiber to form an integral bundle of hollow fibers. The bundle is the cooled to form a solid mass providing a fluid-tight seal around each fiber such that the ends of the hollow fibers are open on one side of the solid mass and the open fiber ends are isolated from the fiber walls of the membrane.

According to a further aspect, the present invention provides a method for producing a hollow fiber membrane fluid transport device. According to the method, a plurality of polytetrafluoroethylene hollow fibers are arranged in an array or a row. A fluorinated homopolymer, copolymer, or terpolymer film on the hollow polytetrafluoroethylene is applied to the fibers so that the film is interwoven with the fibers near one end or both ends of the hollow polytetrafluoroethylene fibers The fibers and film are rolled into a bundle. The bundle is heated and compressed to melt the film such that the film is applied to the fibers at a contact temperature lower than the melting point of the fibers thereby causing the hollow fibers to form a bundle of hollow fibers. The bundle is then cooled to form a fluid-tight seal around the fibers such that the ends of the hollow fibers are open on one side of the solid mass and the open fiber ends are isolated from the fiber walls of the membrane.

DETAILED DESCRIPTION OF THE INVENTION

This invention provides a simple, fast, and reliable method for producing a membrane contactor comprising a plurality of hollow fiber membranes produced from polytetrafluoroethylene or other fluoropolymers employing a potting compound comprising of a perfluorinated or fluorinated thermoplastic to seal the ends of the hollow fibers and bind them into a solid mass. The invention further provides for the membrane contactor or filter module made by the inventive method.

The hollow fiber membranes used in this invention are produced from polytetrafluoroethylene homo or copolymers, but the technique is applicable to any polymeric or inorganic hollow fiber membrane, and represents an excellent technique for potting ceramic hollow fiber membranes as it minimizes risk of breakage of the fragile fibers.

The potting film that is used in this invention may be produced from any fluorinated or perfluorinated thermoplastic such as: PFA (polytetrafluoroethylene perfluoropropyl vinyl ether), FEP(perfluoroethylene propylene polymer), MFA (polytetrafluoroethylene perfluoro methyl vinyl ether), PVDF (polyvinylidene fluoride), THV (tetrafluoroethylene, hexafluoropropylene, vinylidene fluoride terpolymer), EFEP (ethylene perfluoroethylene propylene polymer), ECTFE (ethylene chlorotrifluoroethylene polymer), ETFE (ethylene tetrafluoroethylene polymer), or other fluorinated or perfluorinated thermoplastics. Preferred compounds are EFEP and THV for lower temperature applications (below 120° C.), MFA and PVDF for applications up to 150° C., and FEP or PFA for applications up to 200° C.

The potting film may be any of a variety of commercially available fluoropolymer or perfluropolymeric films manufactured from the resins listed above (DeWal Industries, Ajedium, are examples of commercial suppliers) or may be extruded as a film via a melt extrusion and calendaring operation known to those practiced in the art or produced by compression molding granules, powder, or pellets into a thin film between two heated platens, or cast from a solution prepared from granules, powder, or pellets of the resins listed above. The preferred method is a film produced via extrusion and calendaring operation.

The film is prepared to a thickness of between 0.01 mm and 2.5 mm, with the preferred thickness between 0.076 mm and 0.125 mm and is generally dependent on the spacing desired between the fibers and the diameter of the fibers.

Shown in FIG. 1, the construction of a two dimensional plane of fibers 10 is the starting point for the film potting method and this two dimensional plane of fibers is hereafter referred to as the web 5. The web can be prepared via different techniques. A number of hollow fibers of a given diameter and porosity are placed in a substantially parallel arrangement by either securing individual fibers to a support frame, or by wrapping a single length of hollow fiber multiple times around a support frame or by any other such means as to generate a two dimensional plane of fibers held stationary and parallel to one another.

Figure 2:
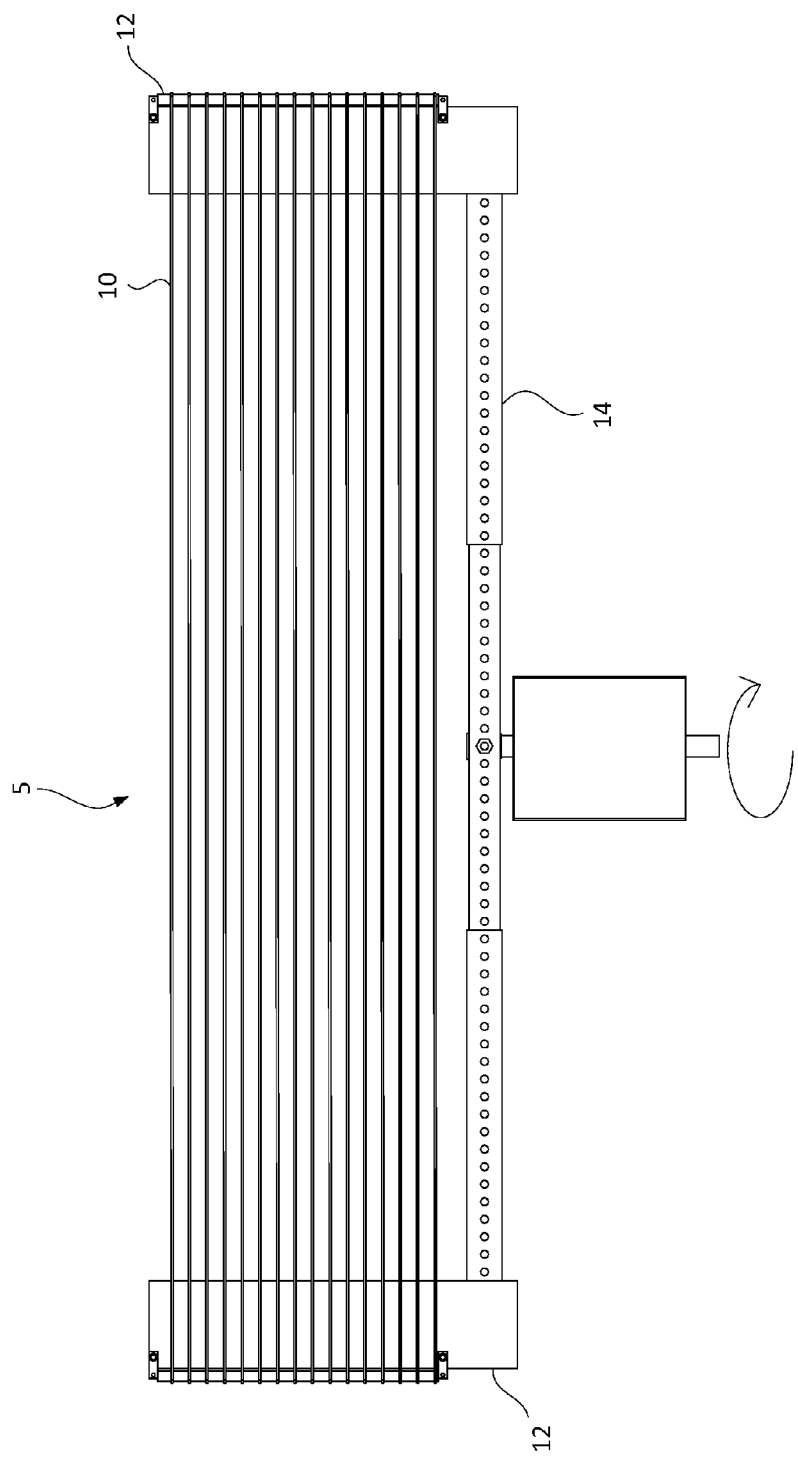
FIG. 2: Support frame with hollow fibers wound over ends
Figure 2A:
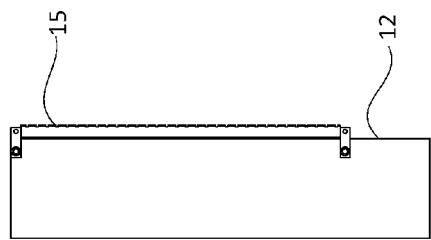
FIGS. 2a and b: Examples of frame end elements with varying spacing
Figure 2B:
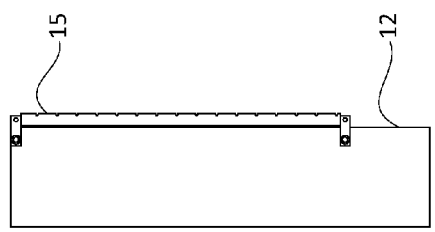

The support frame may be one of any number of suitable types of designs, but generally consists of three or four sides lying in the same plane, approximating a rectangle where each of the opposite pairs of sides are substantially parallel to one another. As shown in FIG. 2, the pair of sides opposite to one another that serve as either the terminal points for the fibers or the ends over which the fiber is wrapped around are referred to collectively as the frame end elements 12. The other side or pair of sides opposite to one another that are substantially parallel to the hollow fibers are referred to as the side elements of the frame 14. It is preferred that the side element 14 or elements 14 are adjustable, allowing the frame end elements to be move apart from one another, enabling the frame to be used for multiple module lengths. It is also preferred that the end frame elements 12 are removable to allow either the spacing between the fibers to be adjustable or to adjust the width of the web being prepared. FIGS. 2a and 2b show two such types of end frame elements.

While individual fibers may be arranged along the perimeter of a frame and secured, one embodiment as shown in FIG. 3 is to wind a single hollow fiber 10 around the end frame elements 12, creating two webs 5 of fibers, an upper web and a lower web, or one long web of double the length of the frame. The frame may be stationary and the fiber wrapped around the frame, or the frame may be rotated about an axis running parallel to the end frame elements 12 as the fiber is fed to the frame. The hollow fibers may be wound around a cylindrical mandrel, however, the use of the cylindrical mandrel is not as preferred as it inhibits the later weaving process and requires a different cylinder for each length of module desired.

It is also preferred that the spacing between fibers is maintained at a distance approximately equal to or slightly greater than the thickness of the potting film being employed, allowing the assembler the ability to control the spacing between the fibers and hence control the spacing between fibers in the final module. The spacing may be controlled by utilizing a few different methods. One method to control the spacing is to use frame end elements, examples of which are shown in FIGS. 2a and 2b that have a series of parallel grooves 15 or slots perpendicular to the major axis of the frame end element. A second method is to use a series of circular disks of known thickness placed in between adjacent fibers. In lieu of circular discs a variety of fin or comb-like structures that allow the fibers to be indexed at uniform spacing along the length of the frame end element can also be used. It is generally desirable that the spacing be equal at the two opposite frame end elements to ensure equal spacing between the fibers in the completed potted assembly.

A primer may be applied to further improve bonding between the potting film and the porous fiber. A dilute solution of the potting resin used to manufacture the potting film is prepared by dissolving either the film, pellets, granules, or powder forms of said potting resin in a suitable solvent. For a film produced from THV 220 may be suitably dissolved in acetone or methyl ethyl ketone. The percent solids in the solvent will be a function of the molecular weight of the polymer, but the solution should be suitably dilute to allow the film deposited to penetrate the pore structure of the fiber. A solution of 6 to 10% solids by weight is suitable, but solutions more dilute, down to 1% solids by weight are also acceptable and as high as 15% solids by weight will work. As the solids level increases, the penetration into the pore structure decreases and the thickness of the dried primer on the outside of the fiber increases.

If used, the primer The solution is brushed or wiped onto the fiber ends where the potting film is to be applied, ensuring coverage around the entire circumference of the fiber membrane, but only covering that portion which will eventually be covered by the potting film as the primer penetrates the pore structure of the membrane and will block pores. The primer is allowed to dry in air for a minimum of two hours at 20° C. to 30° C. While application of heat will accelerate the drying process, this is less preferable as there is risk of forming bubbles from the solvent being released too quickly. After the primer has dried, the fiber array is ready for application of the film for the next step in the potting process.

Figure 4:
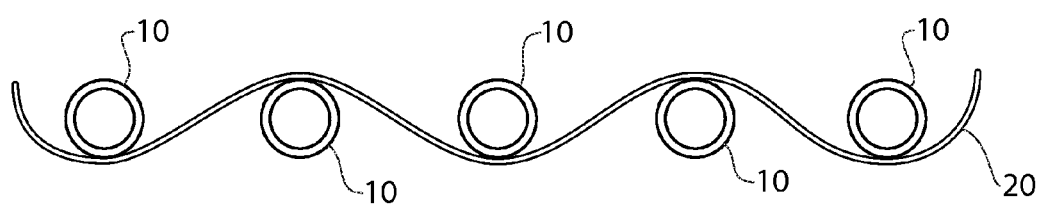
FIG. 4: End view of hollow fibers with first weave tape
Figure 5:
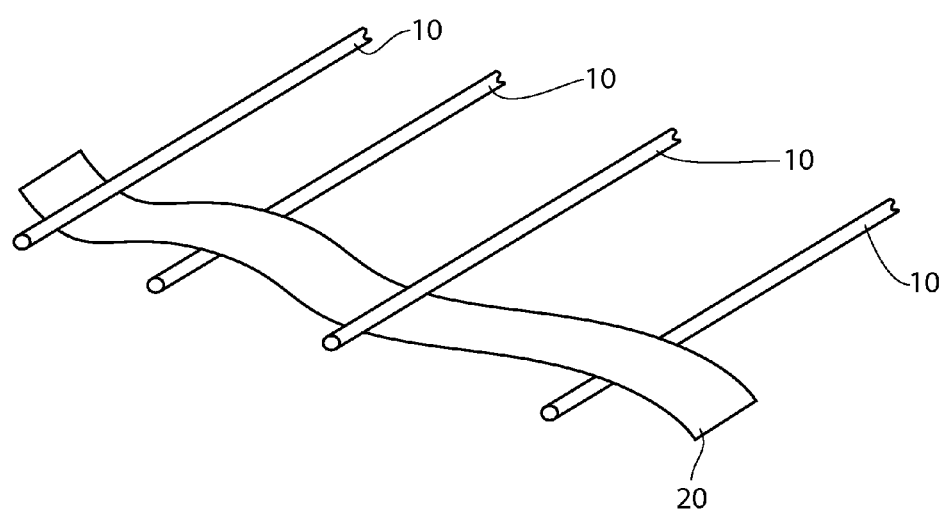
FIG. 5: Isometric view of hollow fibers and first weave tape

Whether or not a primer is employed, the next step in the film potting process is to begin applying strips of potting film to the ends of the fiber web. As shown in FIG. 4, typically a length of thin film 20, preferably a fluoropolymer, is inserted between the fibers 10 in a direction substantially perpendicular to the major axis of the fibers at or near either of the frame end elements. FIG. 5 shows an isometric view of the fibers with one strip of film woven between them. The film 20 is first fed over the top of the first fiber 10 and underneath the adjacent fiber 10. This sequence repeating itself in such a way as to ensure that each fiber has at least one layer of the film between that fiber and each adjacent fiber until all the fibers have been separated from one another by one layer of film.

Figure 6:
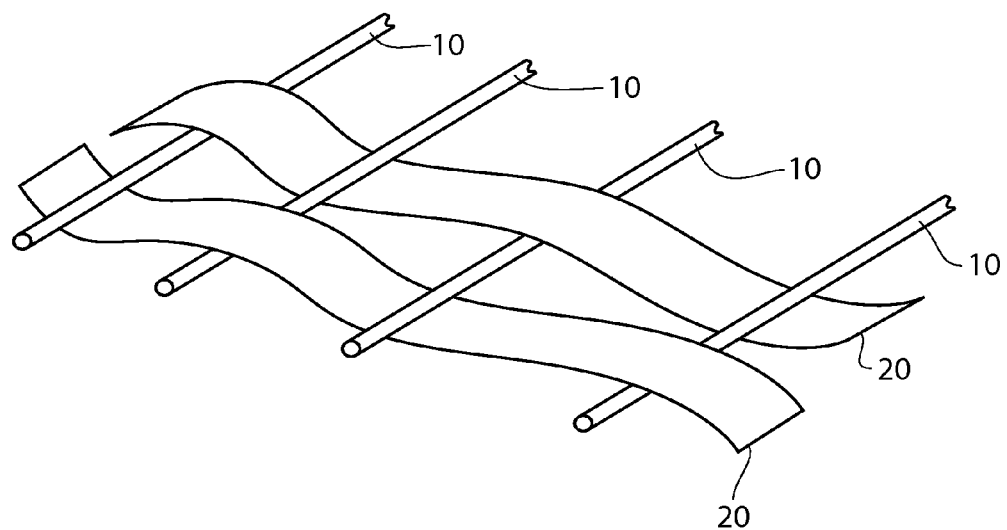
FIG. 6: Isometric view of hollow fibers with two weave tapes

The thin film 20 may be a single strip woven between the fibers, or, as shown in FIG. 6, may consist of two or more strips 20 of said film woven between the fibers in alternating directions next to one another, with the first strip passing over alternate fibers, the adjacent strip passing under those same alternate fibers, resulting in a longer potted portion of fiber. A second strip of film or set of film strips may then be woven in a similar manner at the opposite frame end element, depending on the type of module to be constructed. If the element is to be a cross flow element or a dead end filter element, both ends are fitted with the strips of film. If the web is to be unfolded to a double length, then no strips are applied at the opposite frame end element.

Figure 7:
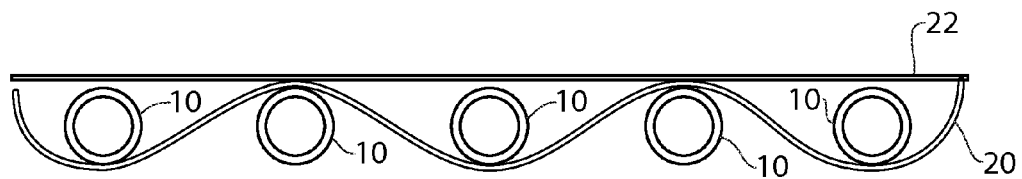
FIG. 7: End view of hollow fibers with first weave tape and upper cross tape

Following the insertion of one or more lengths of thin film alternating between the fibers, a length of thin film 22 is then placed perpendicularly to the major axis of the fiber as shown in FIG. 7, on top of the array of fibers and along the same axis as the strips of film previously woven between the fibers. This strip of film may be wider or narrower than the band of woven strips, but preferably is of the same width as the combined width of the woven strips and is referred to as a crossing film.

The thickness of this first crossing film may be of variable thickness, chosen by the assembler to control the distance between the fibers as they are bundled. Use of a crossing film is not necessary, but can help to ensure that the potted end is leak-free and also helps to control spacing between the fibers.

The crossing film and the woven film are then heated at a temperature that is greater than 10° C. above the melting point of the polymer from which the film was made until the crossing film fuses with the woven film strip or strips.

After bonding crossing strips to the woven strips at either or both ends of the frame, the frame may be flipped over and the process repeated on the reverse side at top and bottom, creating two identical webs ready for the last step prior to bundling. For a single web of double length, only one end on the reverse side is potted.

After applying the weave strips and the crossing strips, the web is removed from the frame. If the web was prepared by wrapping a hollow fiber, the fibers are cut along the major axis of the frame end elements separating the fibers into two webs, one formed on the top of the winding rack, one on the bottom. If only one end of the top web and bottom web were prepared with the fluoropolymer films, then the web is opened up on itself to form a single web of a length double that of the winding frame.

Figure 8:
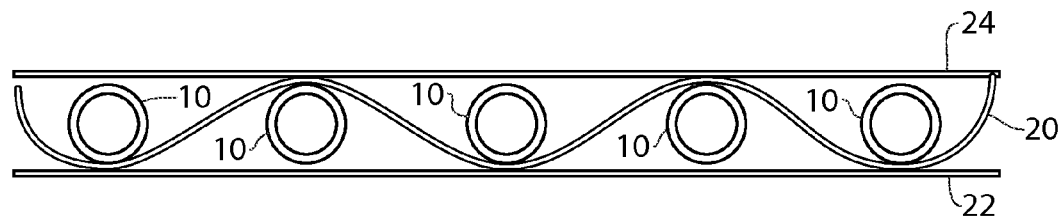
FIG. 8: End view of hollow fibers with first weave tape and one cross tape
Figure 9:
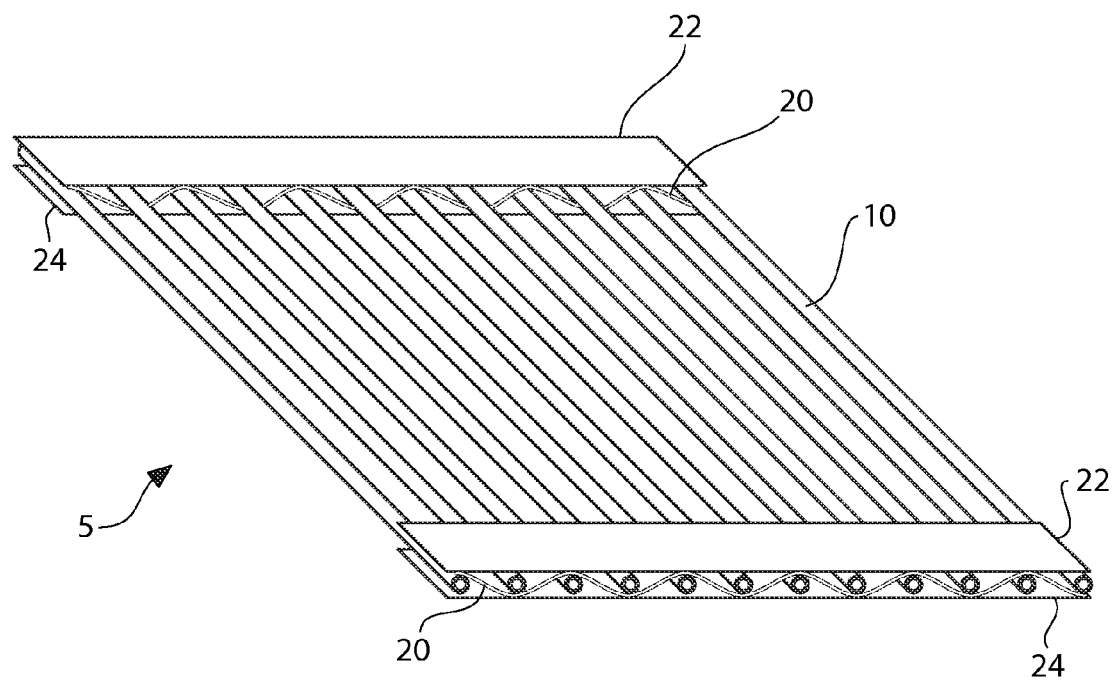
FIG. 9: Isometric view of hollow fiber web with completed tapes

The single web or the two matching webs are then placed on a flat surface, with the face having the upper crossing film face down. A second crossing strip 24 is then placed along the woven strips, as shown in FIG. 8, parallel to the previously applied crossing strip, but on the opposite sides of the fibers. If the opposite ends of the fibers were fitted with film, then a second crossing tape is applied to that end as well. FIG. 9 shows the completed web 5 of fibers 10 with woven film 20 and upper 22 and lower 24 crossing strips applied at both ends of the web.

Figure 10:
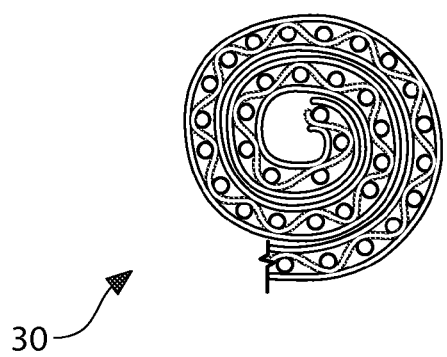
FIG. 10: End view of spiral wrapped hollow fiber web

On completion of the individual web, it is carefully rolled up upon itself as shown as an end view in FIG. 10, allowing the ends of the fibers fitted with the strips of film to wind up in a spiral 30. Additional webs may then be wound onto the roll simply by abutting the end of one web with the beginning of the other, having trimmed any excess of the film from the ends of each. Additional webs are applied until the final fiber count is achieved. The web may be wound up on itself or may be wrapped around a core piece to provide support or structure. The core piece may be a fluoropolymer rod or may be machined from stainless steel or other compatible metals or polymers. If one uses a metal core, it is important that the surface be roughened or pre-coated with a fluoropolymer that is compatible with the film used for potting to ensure good adhesion and no leakage between the fibers and the solid core piece.

The potted fiber bundle is completed by a combination of applied heat and compression. Radial compression of the taped end by heating and compressing means causes the fiber ends to translate radially toward the centerline of the cylindrical bundle, reducing the distance between adjacent fibers is until all interstitial volume between the fibers is eliminated and the fused tape contacts all outer surfaces of the membranes. This results in a leak proof potted end. The compression and applied heat are essential for establishing void-free, leak free high packing density potted ends.

The radial compression may be achieved by any number of means, but several factors are important. The compression must be slow enough so as not to deform the hollow fibers and cause them to become closed off, and the compression should be done in a manner that maintains as true a right rectangular cylindrical shape to the potted end as possible. The end fitted with the strips of film is heated to a temperature at least 10° C. above the melting point of the film and allowed to reach equilibrium, the time required to reach equilibrium dictated by the size of the module.

The compressing means may be by several methods all which achieve a gradual compression and maintain a cylindrical shape while being heated: including but not limited to: heat shrinkable sleeving, various collet systems, adjustable centerline roller systems, and an adjustable sleeving system. There are other methods of achieving the compression that would be obvious to those skilled in the art on understanding the function of the compression.

Figure 11:
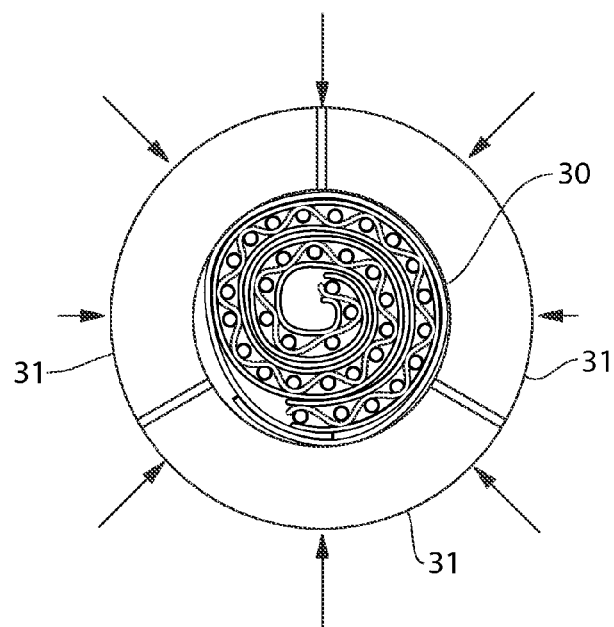
FIG. 11: End view of spiral wrapped hollow fiber web with collet compression

Achieving compression via a collet system as shown in FIG. 11 consists of placing the rolled end 30 of the fibers fitted with the woven and crossing films in a collet system 31 of a diameter large enough to accommodate the rolled and uncompressed bundle whose closed diameter is equal to or less than the desired final compressed diameter of the fiber bundle. The collet assembly holding the bundle of fiber fitted with the potting films is placed in an oven or heated chamber and brought up to a temperature at least 10° C. above the melting point of the film used for potting.

Figure 12:
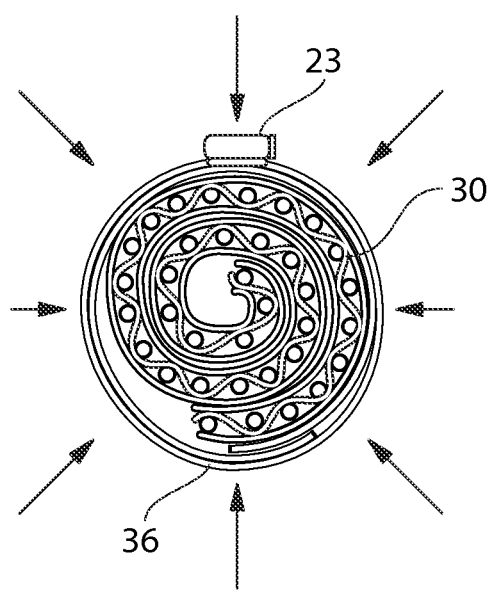
FIG. 12: End view of spiral wrapped hollow fiber web with adjustable sleeving

Achieving the compression via an adjustable sleeving system as shown in FIG. 12 is achieved by placing a suitable band 35 of tempered steel around the rolled bundle 30. The band consists of a strip of metal that has preferably been coated with PTFE or similar release agent. The width of the band should be no wider than the length of the potted region of the fibers. The band should overlap on itself by at least 5% and preferably about 25% to maintain a uniform circle and so when radially compressed via a circular clamp 23, the end of the band slides over top of itself and reduces in diameter in proportion to the tightening of the outer band clamp. The thickness of the tempered steel is between 0.1 mm to 0.127 mm, but may be as thin as 0.0254 mm for smaller bundles and as thick as 0.05 mm for larger diameter bundles.

The fiber bundle is compressed until the desired final diameter is achieved and all the voids between the fibers have been eliminated. The final diameter may be simply where all the voids are eliminated but may be reduced more by further tightening of the bundle. The compressed potted end is removed from the heat source and allowed to cool at which time the compression means is removed from the potted end.

Figure 13:
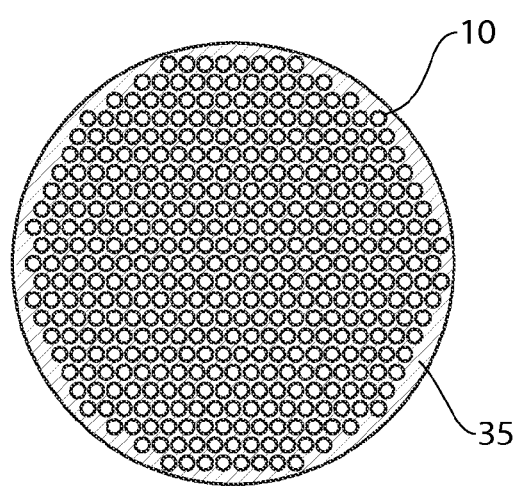
FIG. 13: End view of compressed and fused hollow fiber bundle

Depending on the number of fibers, the diameter of the fibers, the softness of the fibers, and the final diameter desired in the bundle, the compression means may be achieved in a single step or multiple applications. For larger bundles, generally exceeding 50 to 80 mm in diameter, benefit from multiple applications of the compression means during build-up of the fibers. FIG. 13 shows an end view of the potted fibers 10 in the solid mass of potting compound 35.

Figure 14:
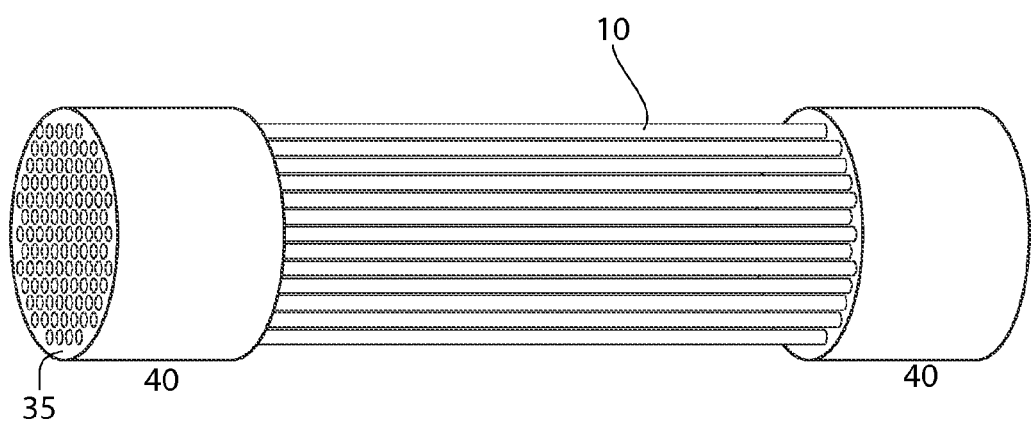
FIG. 14: View of cross flow potted hollow fiber bundle

For a cross flow module, the final bundled assembly has two potted ends 40, each of which resembles the potted cross section shown in FIG. 13. FIG. 14 shows a drawing of such a potted bundle.

Figure 15:
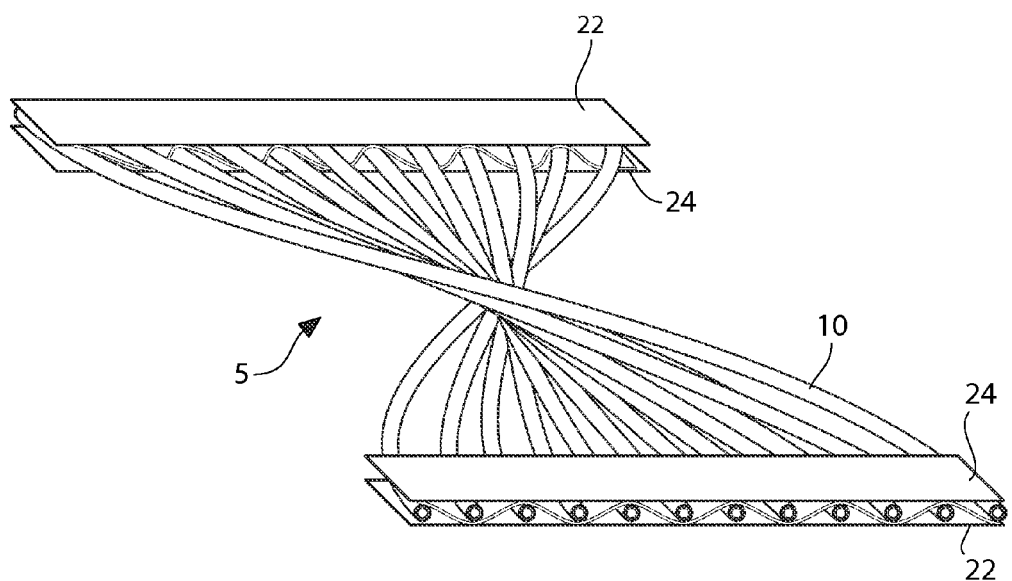
FIG. 15: View of web prepared for dead end filter element
Figure 16:
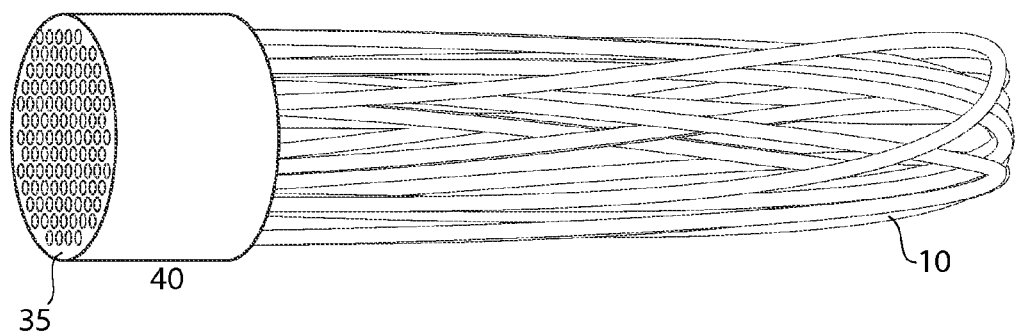
FIG. 16: Completed dead end filter element

To achieve a similar configuration for a dead-end or single potted end, one prepared end of the web 5 is flipped over on itself (FIG. 15) while holding the other end stationary, resulting in the web 5 being twisted along the plane of the web with the result that the top strip 22 at one end of the web no longer lies in the same plane as the top strip 22 on the other end of the web. The web is then rolled and compressed in a manner similar to that previously outlined resulting in a potted bundle with looped fibers 10 shown in FIG. 16.

Fiber Potting Characterization

To validate the integrity of the potted end, there is a need for a test that shows no leakage around the fibers between the fiber wall and the potting compound at elevated pressures. A method common to those practiced in the art was employed which involves the determination of the bubble point of the fiber using isopropyl alcohol. The bubble point method includes a number of steps. In the first step the fiber is wetted in isopropyl alcohol (IPA) and pressurized to ensure there is no trapped air in the pores of the fiber. The fiber is then looped and immersed in a clear container of IPA with the two lumen ends above the level of the IPA. Air pressure is applied to the lumen ends in small increments until the first bubble of air is observed on the outside of the fibers. The resulting pressure is the bubble point pressure and is an indication of the largest pore in the fiber as the IPA in that pore is the most readily (lowest pressure) displaced by the incoming air pressure.

The integrity of a potted end may be tested by sealing the potted end in a dear tube of plastic or glass and immersing the pendant hollow fibers in IPA. Air pressure is applied to the open lumen ends of the hollow fibers and the potted end is observed as well as observing the first appearance of a bubble on the fiber walls. If no bubbles appear at the wetted face of the potted end and the bubble point pressure matches that of the single fiber, the integrity of the potted seal has been shown.

To test the strength of the bond between the fiber and the potted assembly, a pull test has been developed that measures the force required to extract a single fiber from the potted end of the bundle (or break the fiber attempting extraction). The test consists of using a Chatillon Force Gauge on an individual fiber from one of the potted ends of the bundle. The bundle is placed under the slotted support bracket to hold it in place. An individual fiber is randomly selected, placed through the slotted support bracket, and tied to a "J" hook attached to the top of the force gauge. The force gauge is activated and extends upward pulling on the individual fiber to achieve separation from the potted bundle or breaking of the individual fiber, whichever comes first. Once the end point is reached, the machine automatically stops and displays the break force value in Newtons.

COMPARATIVE EXAMPLE 1

Twenty hollow fibers with an outer diameter of 1.5 mm and an inner diameter of 1.0 mm and a porosity of 55% were potted using an epoxy potting compound formulated by Henkel Corporation (Loctite®) for use with fluoropolymer resins.

Two samples were prepared, with the fibers for the first sample left untreated while the fibers for the second sample were treated with a Corona Discharge to promote adhesion with the epoxy. The corona discharge consisted of five second exposures four times followed by rotation of the fiber by 90° and repeating the treatment until the fiber had been rotated 360°.

The epoxy was Loctite product X263572, developed expressly for use with fluoropolymers and other low surface energy polymers. Approximately 350 grams of resin were mixed with 122 grams of hardener. A fixture was made to suspend the fibers in a 100 ml beaker so that they did not touch the sides or the bottom of the beaker. The fibers were looped over the top of a rod so that the ends of the fibers were suspended in the resin.

The epoxy was cured for 10 hours at 22° C. followed by 2 hours at 65° C. and 2 hours at 120° C. to achieve a complete cure. Following cooling to room temperature for 4 hours, the beakers were removed and the bottom 2-cm was cut off from each potted end. The ends were polished to achieve a clean finish on the potted ends.

The adhesion between the fiber and the potting resin was tested using a Chatillon force gauge attached to an individual fiber and pulled to failure. In each case the failure mode was the fiber pulling free of the epoxy. For the untreated fiber, the average pull force required to pull out the fiber was 3.37 lbf or 15 Newtons. The treated fibers had an average pullout force of 7.53 lbf or 33.5 Newtons.

EXAMPLE 1

In this example, the film potting method is used to make a cross flow module consisting of 110 hollow fibers potted at both ends of the bundle.

110 loops of a hollow fiber membrane prepared from polytetrafluoroethylene with an inner diameter of 1.5 mm and an outer diameter of 1.9 mm with a porosity of 40% were wrapped around a winding frame 400 mm from end to end and 250 mm wide. The winding frame was fitted with slotted rods at each end, with spacing between slots of 2.0 mm, ensuring spacing between the hollow fibers of 0.1 mm.

A potting film pre pared from Ethylene Fluorinated Ethylene Propylene copolymer (EFEP, Daikin RP 4020) with a thickness of 0.0762 mm, a width of 25.4 mm, and a length of 220 millimeters was woven between each individual fiber at the end of the winding frame. The film was passed underneath the first fiber on the frame and then alternately passed over the top of the next fiber and underneath the following fiber. This pattern was repeated until the film was passed between each fiber on the winding rack. The excess tape was trimmed off. A second strip of tape of similar size was placed on top of the hollow fibers (referred to as the top tape), directly above the woven strip. The end of the winding rack containing the tape was heated above its melting point of 160° C. by means of a forced air heat gun set at 450° C. for 45 seconds. The potting tapes melted sufficiently to attach to each other and to the hollow fibers.

The weaving process was repeated at the other end of the winding rack, followed by application of a top layer of film heated and bonded to the fibers and the woven film. The process was again repeated on the two ends on the back side of the winding rack.

The fibers were removed from the winding rack by cutting the fibers along the major axis of the slotted ends containing the tape, forming two webs of fibers bound by the potting tape. Each woven web containing 110 fibers was laid on a flat surface fitted with the side fitted with the top tape facing downward. A third piece of potting film of similar dimensions (bottom film) was placed over the hollow fibers directly above the other two films and heated in a similar manner, bonding the two strips of film to one another and to the hollow fiber.

The first web was subsequently wound into a tight cylinder, being careful that the ends remained parallel and that the diameters of each end were identical. The second web was subsequently added to the end of the first web and continued to be wrapped, resulting in a final diameter of approximately 38 mm in diameter.

To compress the bundle ends and occlude any voids, each taped end was fitted with a sleeve of a fluoropolymer heat shrink with an inner diameter of 38 mm (FEP 160 DuPont, 1.3:1 expansion ratio) approximately 25 mm long. Each taped end was then placed in an oven at 232° C. for 30 minutes. The heat shrink tubing reduced in diameter, compressing the bundle of fibers into a contiguous mass. The resulting mass was allowed to cool for 30 minutes. The fluoropolymer heat shrink was then cut from the potted end.

The potted bundle final diameter was 32 mm with a packing density of 78%. Examination of the potted ends via optical microscopy revealed no voids in the potted ends and good contact between the EFEP potting resin and the fibers. The resulting module was pressure tested by using the method outlined above and found to be fluid tight.

Subsequent testing of the individual fibers showed a pull strength of greater 75 Newtons, with the fiber failing before the bond with the potting.

EXAMPLE 2

In this example, the film potting method is used to produce a dead-end filter module. A continuous length of porous PTFE hollow fiber with the dimensions of 1.0 mm inner diameter and 1.5 mm outer diameter, with a specific gravity of 0.9 grams/cm$^3$ was employed for this module. Using the winding apparatus previously described in Example 1, the fiber was wound between the two end pieces 120 times to create two 120-fiber webs on the top and bottom of the winding frame. The spacing between the fibers was maintained by machined grooves in the end pieces of the winding frame. The spacing between the fibers was set at 1.6 mm. The spacing between the two end elements of the frame was 610 mm. This process was repeated several times to generate sufficient fibers to make the unit.

A strip of 0.051 mm thick THV-220G film (Dyneon) with a width of 50 mm was woven in between the porous hollow fibers following previously described methodology at the two ends of the winding frame. After weaving one strip of film at each end of the winding frame, another strip of film of identical dimensions was placed directly over the top of the fibers. Using an industrial heat gun set at 450° C., hot air was passed over the film for approximately 30 seconds. The film was fused to the individual fibers as well as to the underlying film. This process was repeated on the opposite end of the frame. The frame was rotated to expose the opposing side and a second strip was applied over the woven strips at both ends of the frame as described above.

The fibers are then cut along the length of the two end pieces creating two individual webs of 100 fibers each that were approximately 610 mm long. Both webs were laid out on a flat surface with the sides without the $2^{nd}$ strip of film facing downward. A third piece of film was then bonded in a similar fashion on top of the woven film on both ends of the web, creating two 120 fiber webs with each end secured by a top film, a bottom film, and a woven film.

To prepare the dead-end filter, a section of a web containing 16 fibers was cut from a larger web. While holding the web on both ends, one end was rotated 180°. The web was then folded in half, laying the taped ends on top of one another. By this action the exit lumen of one fiber at the start of the web is placed adjacent to the entrance lumen of the furthest most fiber on the other side of the web. The web is rolled up at the taped ends to create a tight cylinder.

To compress the bundle into a solid mass, a 50 mm length of 12 mm ID FEP (1.3 to 1 ratio) heat shrinkable sleeve was subsequently placed over the bundled end placed into a tunnel heater at 218° C. for fifteen minutes. The bundle was removed and allowed to cool at room temperature for approximately 20 minutes. The heat shrink sleeve was carefully scored and removed from the bundled end.

Another small web consisting of thirty-one fibers was twisted and folded in the same fashion as the first web and rolled around the original bundle. A 50 mm length of 38 mm ID FEP (1.6 to 1 ratio) heat shrink sleeving was placed over the bundle and heated at 218° C. for fifteen minutes. The bundle was removed and allowed to cool at room temperature for approximately twenty minutes, followed by removal of the FEP heat shrink sleeve. The process of preparing and folding web sections was repeated using webs of 63 fibers, 70 fibers, 80 fibers, 123 fibers, 50 fibers, each followed by compression with the appropriately sized FEP heat shrink and heating in the oven.

The final bundling process involves wrapping a 2,750 mm×5 mm wide strip of 0.127 mm THV 500G film/tape around the bundle and then placing a 5 mm long piece of 76 mm diameter FEP heat shrink sleeving over the tape and heat at 232° C. for thirty minutes. The bundle is removed from the oven and allowed to cool for forty-five minutes.

Following removal of the heat shrink sleeve, the final step in the method can consist of trimming off 25 mm of the potted end for a fresh clean finished bundle, exposing the open lumen ends. This finished "dead-end" cartridge produces an outside diameter of 67 mm, containing 433 individual fibers with 886 open lumen ends with an active filtration length of 250 mm. Pull strength of individual fibers were measured as described and averaged 70 N.

EXAMPLE 3

In this example, the film potting method is used to produce a double ended cross flow module using double weaves. 200 loops of a hollow fiber membrane prepared from polytetrafluoroethylene with an inner diameter of 1.5 mm and an outer diameter of 1.9 mm with a porosity of 65% were wrapped around a winding frame 1000 mm from end to end and 400 mm wide, fitted with slotted rods at each end, with spacing between slots of 2.0 mm, ensuring spacing between the hollow fibers of 0.1 mm.

A potting tape prepared from Dyneon THV-220 with a thickness of 0.0762 mm, a width of 25.4 mm, and a length of 600 millimeters (referred to as the weave tape) was woven between each individual fiber at the end of the winding frame starting by passing under the first fiber, over the adjacent fiber, and continuing across the frame, resulting in a strip of potting film being interlaced between the fibers. The excess tape was trimmed off.

After completing the initial weaving step, a second piece of the THV 220 film of similar dimensions was woven next to the first piece of THV tape, reversing the weaving pattern from the first film. The second piece of film was woven by first passing the film over the first fiber, under the second fiber, and on until the second strip has been woven between all the fibers. This weaving process was repeated at the opposite end of the frame.

A strip of film that is double the width of the individual weaving strips but of the same length was placed on top of the hollow fibers (referred to as the top tape), directly above the woven strip. The end of the winding rack containing the tape was heated so that the film was brought above its melting point of 160° C. by means of a forced air heat gun set at 450° C. for 60 seconds. The potting tapes melted sufficiently to attach to each other and to the hollow fibers. This process was repeated at the other end of the winding rack. The process was again repeated on the two ends on the back side of the winding rack.

The fibers were cut at the ends of the winding frame to create two individual webs of fiber. Each web was placed on a flat surface with the top strip facing downwards and another strip of film applied across the woven strips and bonded in a similar fashion to the first side.

On completion of applying the potting film, the web is rolled up on itself. After rolling the 200 fiber web a diameter of approximately 46 mm was achieved. A 50 mm long piece of 38 mm (1.3/1) FEP heat shrink and slide over each end of the bundle. Each potted end is placed in an oven at 233° C. for a period of 30 minutes to achieve a finished diameter of approximately 39 mm after removing the FEP heat shrink.

The bundle was removed from the oven and allowed to cool for 30 minutes. Once cooled, the FEP heat shrink was removed and the second 200 fiber web was rolled onto the compressed bundle resulting in a diameter of approximately 56 mm. Another 50 mm long piece of 60 mm FEP heat shrink was placed over each end of the bundle and placed in an oven at 232° C. for a period of 30 minutes to achieve a finished diameter of 51 mm. The bundle was removed from the oven and allowed to cool for 30 minutes. The FEP heat shrink was removed and approximately 25 mm was trimmed off of each bundled end resulting in a clean flush cut with open lumen ends. The average pull-out strength was measured at 68 Newtons.

EXAMPLE 4

In this example the tape potting method utilizing a spring steel compression is used to produce a dead-end filter module.

200 loops of a hollow fiber membrane prepared from polytetrafluoroethylene with an inner diameter of 1.0 mm and an outer diameter of 1.4 mm with a porosity of 43% were wrapped around a winding frame equipped with slotted ends spaced at 1.5 millimeters, ensuring spacing between the hollow fibers of 0.1 mm.

A potting film prepared from Dyneon THV-220 with a thickness of 0.0762 mm, a width of 25 mm, and a length of 400 mm was woven between each individual fiber at the end of the winding frame resulting in a pattern wherein the tape was alternately passed over the top of one fiber and underneath the adjacent fiber. A strip of film of similar size was placed underneath the hollow fibers, directly beneath the woven strip. A third strip of film was placed above the woven strip. The end of the winding rack containing the film was heated via a hot air gun set at 450° C. for 45 seconds. The potting films melted sufficiently to attach to each other and to the hollow fibers.

The fibers were removed from the winding rack by cutting the fibers along the major axis of the slotted end containing the film. One end of the hollow fiber membrane web was then folded over on itself resulting in a 180 degree twist in the web. The two taped ends were laid on top of one another. The entire taped web was subsequently wound into a tight cylinder with the taped fiber ends wrapping up on themselves.

To achieve compression, the taped end was fitted with a sleeve of spring steel (0.178 mm 1095 grade tempered spring steel) approximately 130 mm long by 5 mm wide. The sleeve of spring steel was in turn fastened with two hose clamps to allow compression of the spring steel. Each taped end was then placed in an oven at 232° C. degrees for 30 minutes. Following 15 minutes of heating, the bundle was removed and the hose clamps tightened, resulting in a 10% reduction in the spring steel sleeve diameter, compressing the bundle of fibers and molten tape into a contiguous mass. The process was continued 2 times. The resulting mass was allowed to cool for 30 minutes.

The potted bundle final diameter was 35 mm with a packing density of 78% in a dead end configuration. The resulting module was pressure tested by observing the bubble point of the hollow fibers as outlined above and it was found to have a fluid tight seal.

Subsequent testing of the individual fibers showed an average puff strength of 71 Newtons.

EXAMPLE 5

The following example illustrates the use of a primer solution of the potting resin to promote adhesion between the potting film and the porous PTFE hollow fibers being assembled into a module.

110 loops of a hollow fiber membrane prepared from polytetrafluoroethylene with an inner diameter of 1.5 mm and an outer diameter of 1.9 mm with a porosity of 65% were wrapped around a winding frame 400 mm from end to end and 250 mm wide, fitted with slotted rods at each end, with spacing between slots of 2.0 mm, ensuring spacing between the hollow fibers of 0.1 mm.

After the fibers are secured to the winding rack, the ends of the individual fibers are pretreated with a solution of the potting resin, in this example a solution of Dyneon THV 220 prepared by dissolving 3 grams of THV 220 per 40 ml of acetone.

Using a synthetic bristle brush, a thin layer of the THV 220 solution is applied to both ends of each fiber, ensuring that the full circumference of each fiber was coated. The coating was applied from the end of each fiber in a distance equivalent to that of the potting film, in this case 25 mm. Following application of the primer coating, the THV solution was allowed to dry at room temperature for 120 minutes. After drying a second layer of the THV solution was applied to the fibers. The second coating was allowed to dry at room temperature for an additional 120 minutes.

A potting tape pre pared from Dyneon THV-220 with a thickness of 0.0762 mm, a width of 25.4 mm, and a length of 600 millimeters (referred to as the weave tape) was woven between each individual fiber at the end of the winding frame starting by passing under the first fiber, over the adjacent fiber, and continuing across the frame, resulting in a strip of potting film being interlaced between the fibers. The excess tape was trimmed off.

After completing the initial weaving step, a second piece of the THV 220 film of similar dimensions was woven next to the first piece of THV tape, reversing the weaving pattern from the first film, that is, passing over the first fiber, under the second fiber, and on until the second strip has been woven between all the fibers. This weaving process was repeated at the opposite end of the frame.

A strip of film that is double the width of the individual weaving strips but of the same length was placed on top of the hollow fibers (referred to as the top tape), directly above the woven strip. The end of the winding rack containing the tape was heated above its melting point of 160° C. by means of a forced air heat gun set at 450° C. for 60 seconds. The potting tapes melted sufficiently to attach to each other and to the hollow fibers. This process was repeated at the other end of the winding rack. The process was again repeated on the two ends on the back side of the winding rack.

The fibers were cut at the ends of the winding frame to create two individual webs of fiber. Each web was placed on a flat surface with the top strip facing downwards and another strip of film applied across the woven strips and bonded in a similar fashion to the first side.

On completion of applying the potting film, the web is rolled up on itself. After rolling the 110 fiber web a diameter of approximately 35 mm is achieved.

A 127 mm piece of 0.178 mm thick 1095 tempered spring steel was wrapped around each end of the bundle and secured with two standard hose clamps. The potted ends were placed in an oven at 233° C. for a period of 30 minutes. The bundle was removed and the hose clamps were tightened approximately 9 times to achieve an outside diameter of approximately 26.5mm or 25% of the original starting diameter. The potted ends were allowed to cool for approximately 30 minutes and the clamps and tempered spring steel strip was removed. Approximately 25 mm was trimmed off each potted end resulting in a clean flush cut with open lumen ends. An average pull strength of 81 Newtons was measured.

It should be noted that throughout this patent application, for the sake of brevity, we use the term X/Y to represent a copolymer of X and Y, and the term X/Y/Z to represent a terpolymer of X and Y and Z.

What is claimed is:

1. A method for producing a hollow fiber membrane fluid transport device, comprising the steps of:
   laying a plurality of polytetrafluoroethylene hollow fibers parallel one another, applying a fluorinated homopolymer, copolymer, or terpolymer film on the hollow polytetrafluoroethylene fibers interwoven through interstitial spaces between the fibers near one end or both ends of the hollow polytetrafluoroethylene fibers, rolling the fibers and film into a bundle,
   heating the bundle to melt the film;
   compressing a portion of the bundle such that molten film flows between the hollow fibers to form an integral bundle of hollow fibers; and
   cooling said film and fibers to form a solid mass providing a fluid-tight seal around each fiber such that the ends of the hollow fibers are open on one side of the solid mass and the open fiber ends are isolated from the fiber walls of the membrane.

2. The method of claim 1 comprising the step of placing the fiber bundle with the potted ends into a cylindrical containment shell comprised of stainless steel.

3. The method of claim 1 comprising the step of arranging the fibers in a U-shape prior to the step of heating so that after the step of cooling, the fibers form a densely packed fiber bundle with a closed end and an open end, with the open end of the fiber bundle embedded in a solid mass, providing a fluid-tight seal around each fiber.

4. The method of claim 1 comprising the step of twisting the fibers 180 degrees after the step of applying the film and then folding the fibers so that the ends overlap so that after the step of cooling, the fibers form a densely packed fiber bundle with a closed end and an open end, with the open end of the fiber bundle embedded in a solid mass, providing a fluid-tight seal around each fiber.

5. The method of claim 1 wherein each end of the bundle is heated and compressed separately thereby forming a fiber bundle, such that the ends of the hollow fibers are potted on or near the two ends of the linear fiber bundle.

6. The method of claim 1 for producing a hollow fiber membrane fluid transport device comprising the step of arranging the hollow fibers in a lemniscate shape, wherein the step of heating comprises heating the bundle above the melting point of the film at 80° C. to 300° C., wherein the steps of compressing and cooling produce a densely packed fiber bundle that is potted in the middle of the lemniscate shape with the middle of the fiber bundle embedded in a solid mass, providing a fluid-tight seal around each fiber and no open ends.

7. The method of claim 1 comprising the step of placing a second portion of film over the top of the fibers, followed by heating at 80° C. to 300° C. to fuse the said second film with the fibers.

8. The method of claim 1 wherein the step of applying the film comprises looping an individual film strand back and forth around the hollow fibers.

9. The method of claim 1 where the step of applying the film comprises interlacing the film around the hollow fibers in a weave prior to rolling the fibers into a bundle.

10. The method of claim 1 wherein the step of applying the film comprises interlacing the film around each hollow fiber in a weave pattern comprising a plain weave, a twill weave, a satin weave, or double single weave.

11. The method of claim 1 wherein the step of rolling comprises rolling the fibers to form a bundle of substantially parallel fibers, wherein the method comprises the step of spirally winding the bundle about an axis which is substantially parallel to the longitudinal axis of the parallel fibers while simultaneously applying the potting film to the ends of the membrane fibers.

12. The method of claim 1 wherein the potting film has a thickness which is less than the diameter of the hollow fibers.

13. The method of claim 1 wherein the potting film has a thickness which is less than one half of the diameter of the hollow fibers.

14. The method of claim 1 wherein the potting film has a thickness which is less than one tenth of the diameter of the hollow fibers.

15. The method of claim 1 wherein the film has a thickness which is less than one hundredth of the diameter of the hollow fibers.

16. The method of claim 1 wherein the step of applying film comprises applying the film so that the length of the portion of film along the length of the hollow fiber is less than or equal to the diameter of the bundle.

17. The method of claim 1 wherein step of applying film comprises applying the film so that the length of the portion of film along the length of the hollow fiber is less than one half of the diameter of the bundle.

18. The method of claim 1 wherein the step of applying film comprises applying the film so that the length of the portion of film along the length of the hollow fiber is less than one tenth of the diameter of the bundle.

19. The method of claim 1 wherein the step of applying film comprises applying the film so that the length of the portion of film along the length of the hollow fiber is less than one hundredth of the diameter of the bundle.

20. The method of claim 1 wherein the step of applying film comprises applying the film so that the length of the portion of potting film along the length of the hollow fiber is even with the ends or near the ends of the hollow fiber.

21. The method of claim 1 comprising the steps of dissolving a portion of polymer substantially similar to the polymer comprising the film in a solvent and applying the dissolved polymer to the hollow fiber and then drying the solvent.

22. The method of claim 1 where the step of applying the film comprises applying the film after the step of drying.

23. The method of claims 21 wherein the steps of applying the dissolved polymer and drying the dissolved polymer infuses the dissolved polymer into pore structure of the hollow fibers, thereby promoting adhesion between the film and hollow fiber.

24. A method for producing a hollow fiber membrane fluid transport device, comprising the steps of:
   arranging a plurality of polytetrafluoroethylene hollow fibers parallel to one another;
   applying a polymer solution to a portion of the fibers, wherein the polymer solution comprises a fluorinated polymer;
   drying the polymer solution;
   weaving a fluorinated film with the fibers so that the fluorinated film overlies at least a portion of the fibers onto which the polymer solution was applied;

rolling the fibers and film tightly into a bundle, heating the film to melt the film such that the film is applied to the fibers at a temperature lower than the melting point of the fibers;

compressing a portion of the bundle such that the film flows between the hollow fibers to form a bundle of hollow fibers; and cooling the film and fibers to form a fluid-tight seal around the fibers to form a solid mass providing a fluid-tight seal around the fibers.

25. The method of claim 24 further comprising the step of placing the fiber bundle with the potted ends into a cylindrical containment shell comprised of stainless steel.

26. The method of any of claims 24 comprising the step of arranging the fibers in a U-shape prior to the step of heating so that after the step of cooling, the fibers form a densely packed fiber bundle with a closed end and an open end, with the open end of the fiber bundle embedded in a solid mass, providing a fluid-tight seal around each fiber.

27. The method of claim 24 comprising the step of twisting the fibers 180 degrees after the step of applying the film and then folding the fibers so that the ends overlap so that after the step of cooling, the fibers form a densely packed fiber bundle with a closed end and an open end, with the open end of the fiber bundle embedded in a solid mass, providing a fluid-tight seal around each fiber.

28. The method of claim 24 wherein each end of the bundle is heated and compressed separately thereby forming a fiber bundle, such that the ends of the hollow fibers are potted on or near the two ends of the linear fiber bundle.

29. The method of claim 24 for producing a hollow fiber membrane fluid transport device comprising the step of arranging the hollow fibers in a lemniscate shape, wherein the step of heating comprises heating the bundle above the melting point of the film at 80° C. to 300° C., wherein the steps of compressing and cooling produce a densely packed fiber bundle that is potted in the middle of the lemniscate shape with the middle of the fiber bundle embedded in a solid mass, providing a fluid-tight seal around each fiber and no open ends.

30. The method of claim 24 comprising the step of placing a second portion of film over the top of the fibers, followed by heating at 80° C. to 300° C. to fuse the said second film with the fibers.

31. The method of claim 24 wherein the step of applying the film comprises looping an individual film strand back and forth around the hollow fibers.

32. The method of claim 24 where the step of applying the film comprises interlacing the film around the hollow fibers in a weave prior to rolling the hollow fibers into a bundle.

33. The method of claim 24 wherein the step of applying the film comprises interlacing the film around each hollow fiber in a weave pattern comprising a plain weave, a twill weave, a satin weave, or a double single weave.

34. The method of claim 24 wherein the step of rolling comprises rolling the hollow fibers to form a bundle of substantially parallel fibers, wherein the method comprises the step of spirally winding the bundle about an axis which is substantially parallel to the longitudinal axis of the parallel fibers.

35. The method of claim 24 wherein the film has a thickness which is less than the diameter of the hollow fibers.

36. The method of claim 24 wherein the film has a thickness which is less than one half of the diameter of the hollow fibers.

37. The method of claim 24 wherein the film has a thickness which is less than one tenth of the diameter of the hollow fibers.

38. The method of claim 24 wherein the film has a thickness which is less than one hundredth of the diameter of the hollow fibers.

39. The method of claim 24 wherein the step of applying film comprises applying the film so that the length of the portion of film along the length of the hollow fiber is less than or equal to the diameter of the bundle.

40. The method of claim 24 wherein the step of applying film comprises applying the film so that the length of the portion of film along the length of the hollow fiber is less than one half of the diameter of the bundle.

41. The method of claim 24 wherein the step of applying film comprises applying the film so that the length of the portion of film along the length of the hollow fiber is less than one tenth of the diameter of the bundle.

42. The method of claim 24 wherein the step of applying film comprises applying the film so that the length of the portion of film along the length of the hollow fiber is less than one hundredth of the diameter of the bundle.

43. The method of claim 24 wherein the step of applying film comprises applying the film so that the length of the portion of potting film along the length of the hollow fiber is even with the ends or near the ends of the hollow fiber.

44. The method of claim 24 wherein the steps of applying the dissolved polymer and drying the dissolved polymer infuses the dissolved polymer into pore structure of the hollow fibers, thereby promoting adhesion between the film and hollow fiber.

45. The method of claim 24 comprising the step of forming the polymer solution by dissolving a portion of a polymer substantially similar to the polymer comprising the film.

* * * * *